United States Patent
Yao et al.

(10) Patent No.: US 7,508,634 B2
(45) Date of Patent: Mar. 24, 2009

(54) MICRO-ACTUATOR, VIBRATION CANCELLER, HEAD GIMBAL ASSEMBLY, AND DISK DRIVE UNIT WITH THE SAME

(75) Inventors: MingGao Yao, DongGuan (CN); Masashi Shiraishi, HongKong (CN)

(73) Assignee: SAE Magnetics (H.K.) Ltd., Hong Kong (CN)

( * ) Notice: Subject to any disclaimer, the term of this patent is extended or adjusted under 35 U.S.C. 154(b) by 415 days.

(21) Appl. No.: 11/264,174

(22) Filed: Nov. 2, 2005

(65) Prior Publication Data
US 2006/0146449 A1  Jul. 6, 2006

(30) Foreign Application Priority Data
Dec. 30, 2004  (CN) .......................... 2004 1 0082329

(51) Int. Cl.
G11B 5/596 (2006.01)
G11B 21/10 (2006.01)
G11B 5/56 (2006.01)

(52) U.S. Cl. ................... 360/294.4; 360/294.3
(58) Field of Classification Search ....... 360/294–294.7
See application file for complete search history.

(56) References Cited

U.S. PATENT DOCUMENTS

| | | | |
|---|---|---|---|
| 5,299,081 A | 3/1994 | Hatch et al. | |
| 5,611,707 A | 3/1997 | Meynier | |
| 5,636,089 A | 6/1997 | Jurgenson et al. | |
| 5,898,544 A | 4/1999 | Krinke et al. | |
| 6,198,606 B1 | 3/2001 | Boutaghou et al. | |
| 6,359,757 B1 * | 3/2002 | Mallary | 360/294.3 |
| 6,538,836 B1 | 3/2003 | Dunfield et al. | |
| 6,617,763 B2 | 9/2003 | Mita et al. | |
| 6,624,984 B2 | 9/2003 | Lewis et al. | |
| 6,671,131 B2 | 12/2003 | Kasajima et al. | |
| 6,700,727 B1 | 3/2004 | Crane et al. | |
| 6,700,749 B2 | 3/2004 | Shiraishi et al. | |
| 6,798,609 B1 * | 9/2004 | Bonin et al. | 360/78.05 |
| 6,807,030 B1 * | 10/2004 | Hawwa et al. | 360/294.4 |
| 6,950,266 B1 | 9/2005 | McCaslin et al. | |
| 6,961,221 B1 * | 11/2005 | Niu et al. | 360/294.4 |

(Continued)

FOREIGN PATENT DOCUMENTS

JP   2002-74871   3/2002

(Continued)

OTHER PUBLICATIONS

U.S. Appl. No. 11/238,998, filed Sep. 2005, Yang et al.

(Continued)

Primary Examiner—William J Klimowicz
(74) Attorney, Agent, or Firm—Nixon & Vanderhye P.C.

(57) ABSTRACT

A head gimbal assembly (HGA) for a disk drive unit that includes a micro-actuator, a slider and a suspension to load the slider and the micro-actuator. The micro-actuator is provided with a vibration canceller that counteracts forces generated by activation of the micro-actuator when making fine head position adjustments. The vibration canceller incorporates PZT elements that generate counteracting forces in the bottom plate of the micro-actuator to cancel the vibration generated by the micro-actuator, thereby providing improved resonance performance for a disk drive unit.

22 Claims, 13 Drawing Sheets

U.S. PATENT DOCUMENTS

| | | | |
|---|---|---|---|
| 7,009,799 B2* | 3/2006 | Sassolini et al. | 360/75 |
| 7,375,911 B1* | 5/2008 | Li et al. | 360/75 |
| 2002/0154459 A1* | 10/2002 | Lisauskas et al. | 361/23 |
| 2002/0163763 A1* | 11/2002 | Budde | 360/294.3 |
| 2003/0147177 A1 | 8/2003 | Yao et al. | |
| 2003/0147181 A1 | 8/2003 | Shiraishi et al. | |
| 2003/0168935 A1 | 9/2003 | Ogawa et al. | |
| 2006/0023338 A1 | 2/2006 | Sharma et al. | |
| 2006/0050442 A1 | 3/2006 | Yao et al. | |
| 2006/0072247 A1 | 4/2006 | Yao et al. | |
| 2006/0082917 A1 | 4/2006 | Yao et al. | |
| 2006/0098347 A1 | 5/2006 | Yao et al. | |

FOREIGN PATENT DOCUMENTS

| | | |
|---|---|---|
| JP | 2002-133803 | 5/2002 |

OTHER PUBLICATIONS

U.S. Appl. No. 11/169,019, filed Jun. 2005, Yao et al.
U.S. Appl. No. 11/080,659, filed Mar. 2005, Yao et al.
U.S. Appl. No. 11/050,823, filed Jan. 2005, Yao et al.
U.S. Appl. No. 11/080,657, filed Mar. 2005, Zhu et al.
U.S. Appl. No. 11/235,549, filed Sep. 2005, Yao et al.
U.S. Appl. No. 11/304,623, filed Dec. 2005, Yao et al.
U.S. Appl. No. 11/169,003, filed Jun. 2005, Yao et al.
U.S. Appl. No. 11/125,248, filed May 2005, Yao et al.
U.S. Appl. No. 11/263,998, filed Nov. 2005, Yao.
U.S. Appl. No. 11/265,385, filed Nov. 2005, Yao et al.
U.S. Appl. No. 11/192,121, filed Jul. 2005, Yao et al.
U.S. Appl. No. 11/304,544, filed Dec. 2005, Yao.
U.S. Appl. No. 11/300,339, filed Dec. 2005, Yao et al.
U.S. Appl. No. 11/385,704, filed Mar. 2006, Yao et al.
U.S. Appl. No. 11/385,698, filed Mar. 2006, Yao et al.
U.S. Appl. No. 11/319,577, filed Dec. 2005, Yao et al.
U.S. Appl. No. 11/353,018, filed Feb. 2006, Yao.
U.S. Appl. No. 11/273,075, filed Nov. 2005, Yao.
U.S. Appl. No. 11/319,580, filed Dec. 2005, Yao et al.
U.S. Appl. No. 11/384,404, filed Mar. 2006, Yao.
U.S. Appl. No. 11/414,546, filed May 2006, Yao et al.
U.S. Appl. No. 11/440,354, filed May 2006, Li.

* cited by examiner

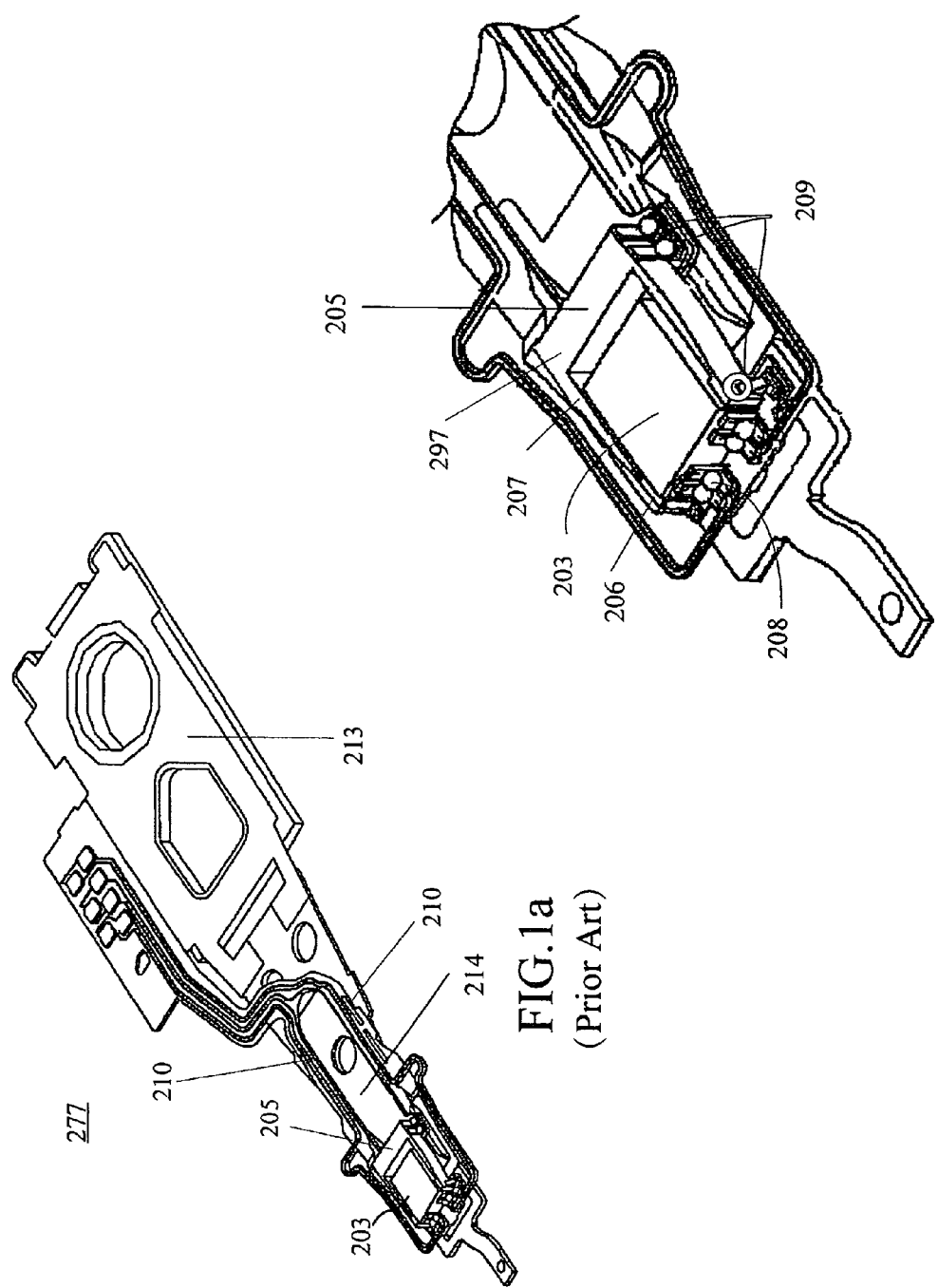

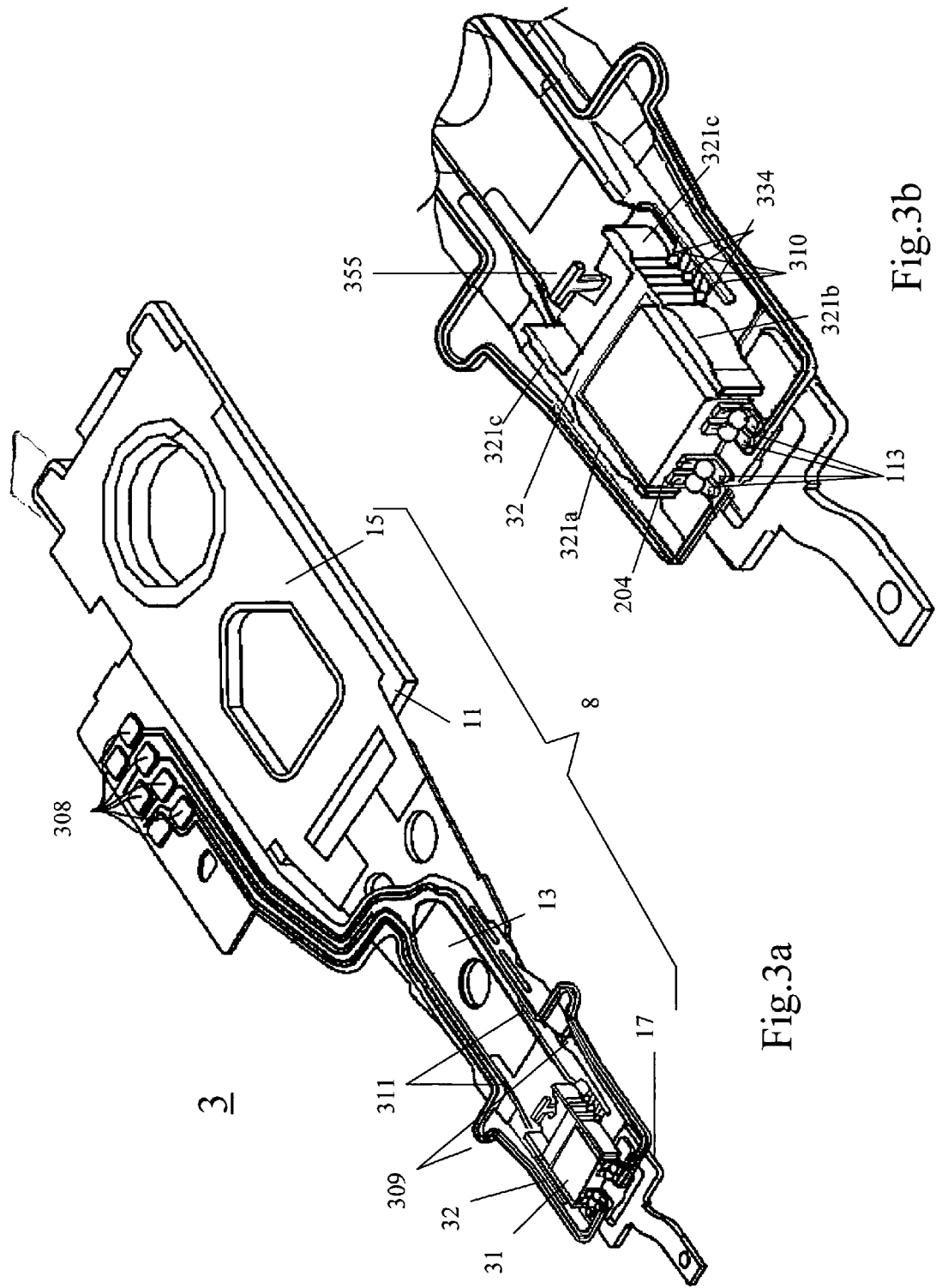

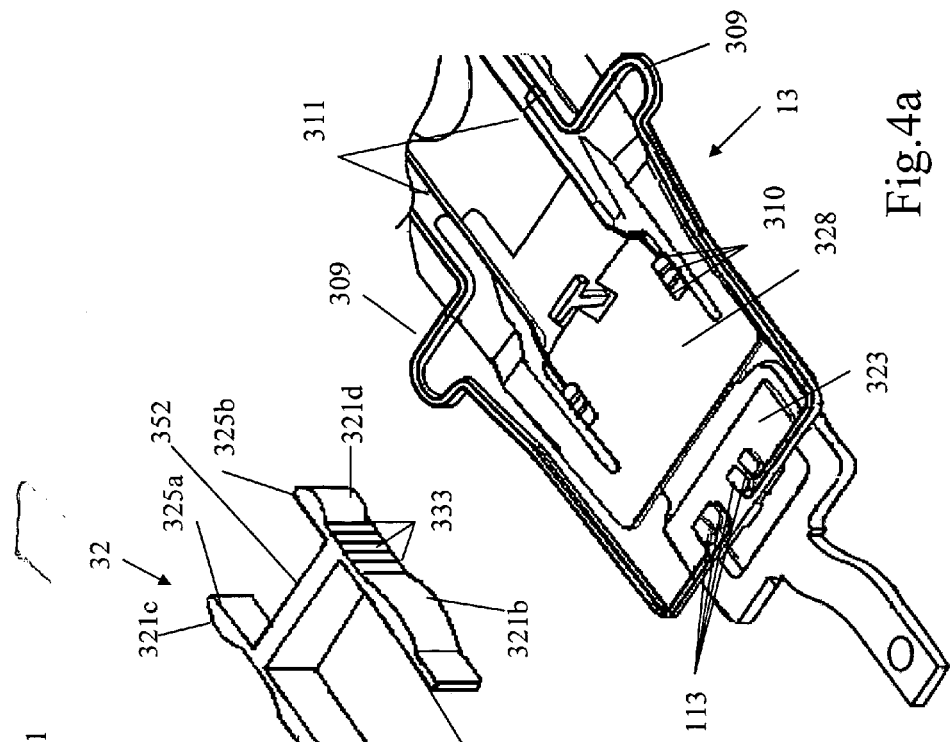
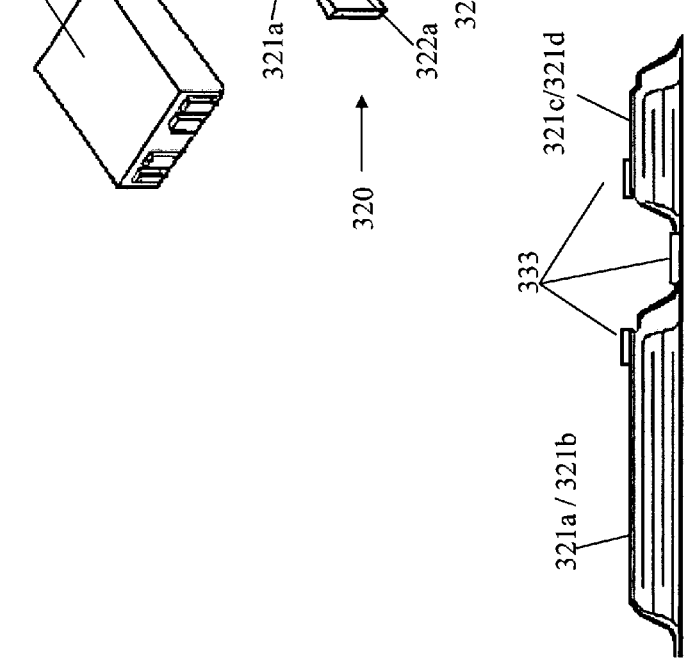
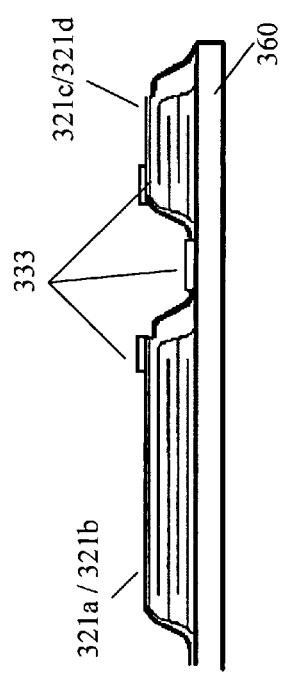
Fig.4a
Fig.4b
Fig.4c

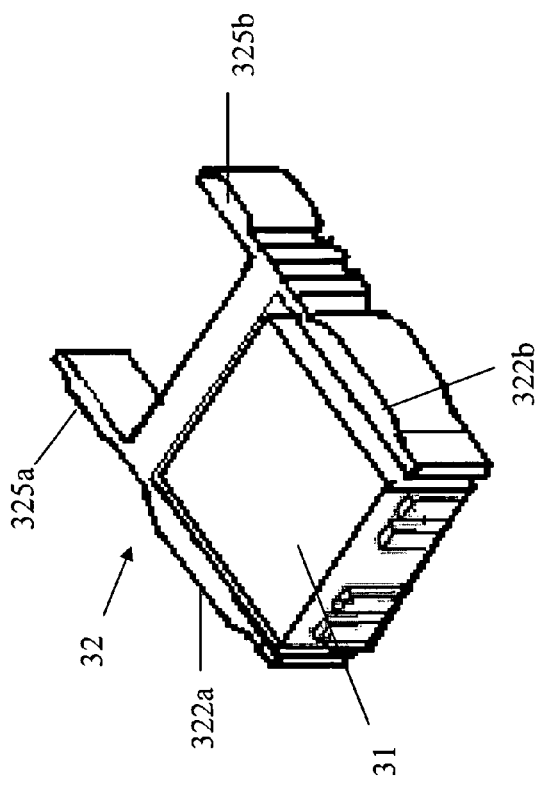
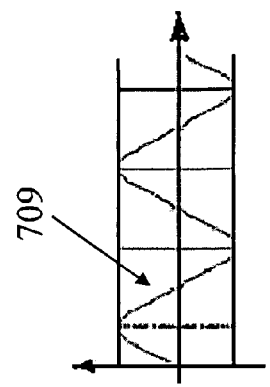
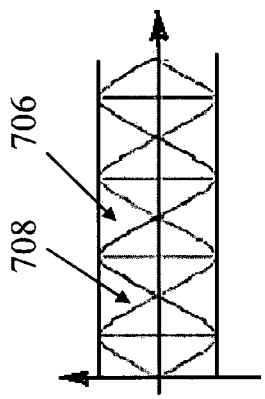
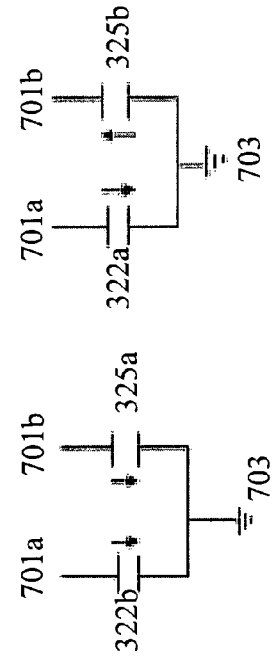
FIG. 7e
Fig. 7d
Fig. 7c
Fig. 7b
Fig. 7a

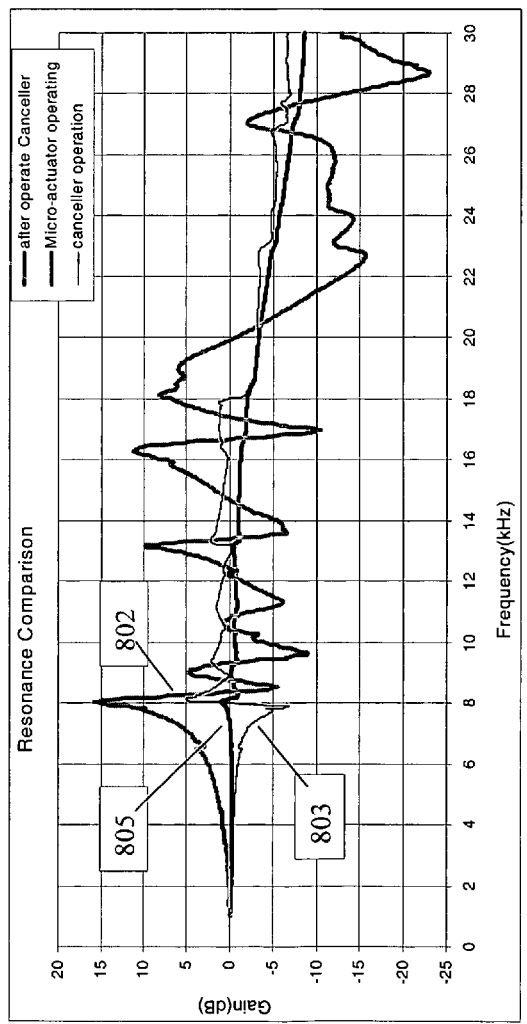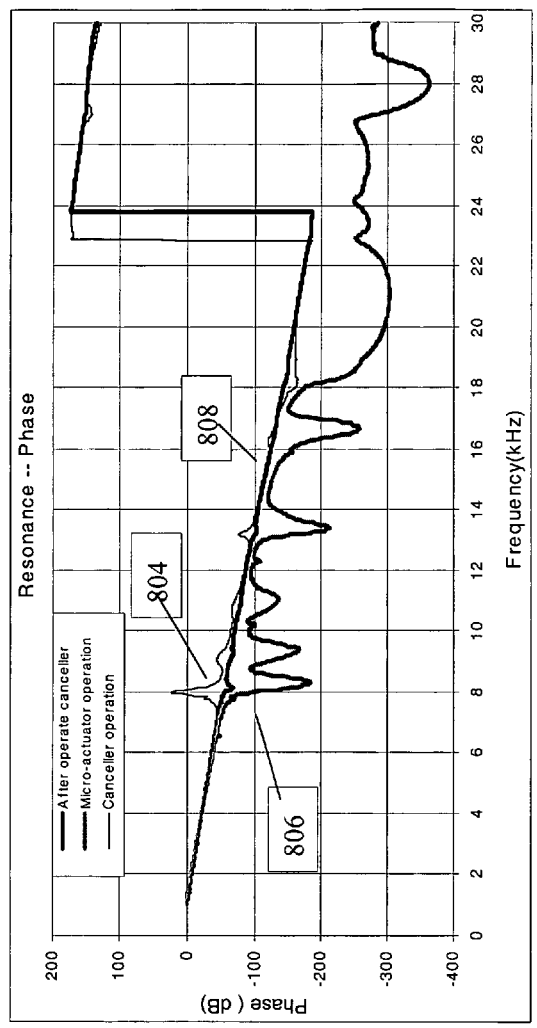

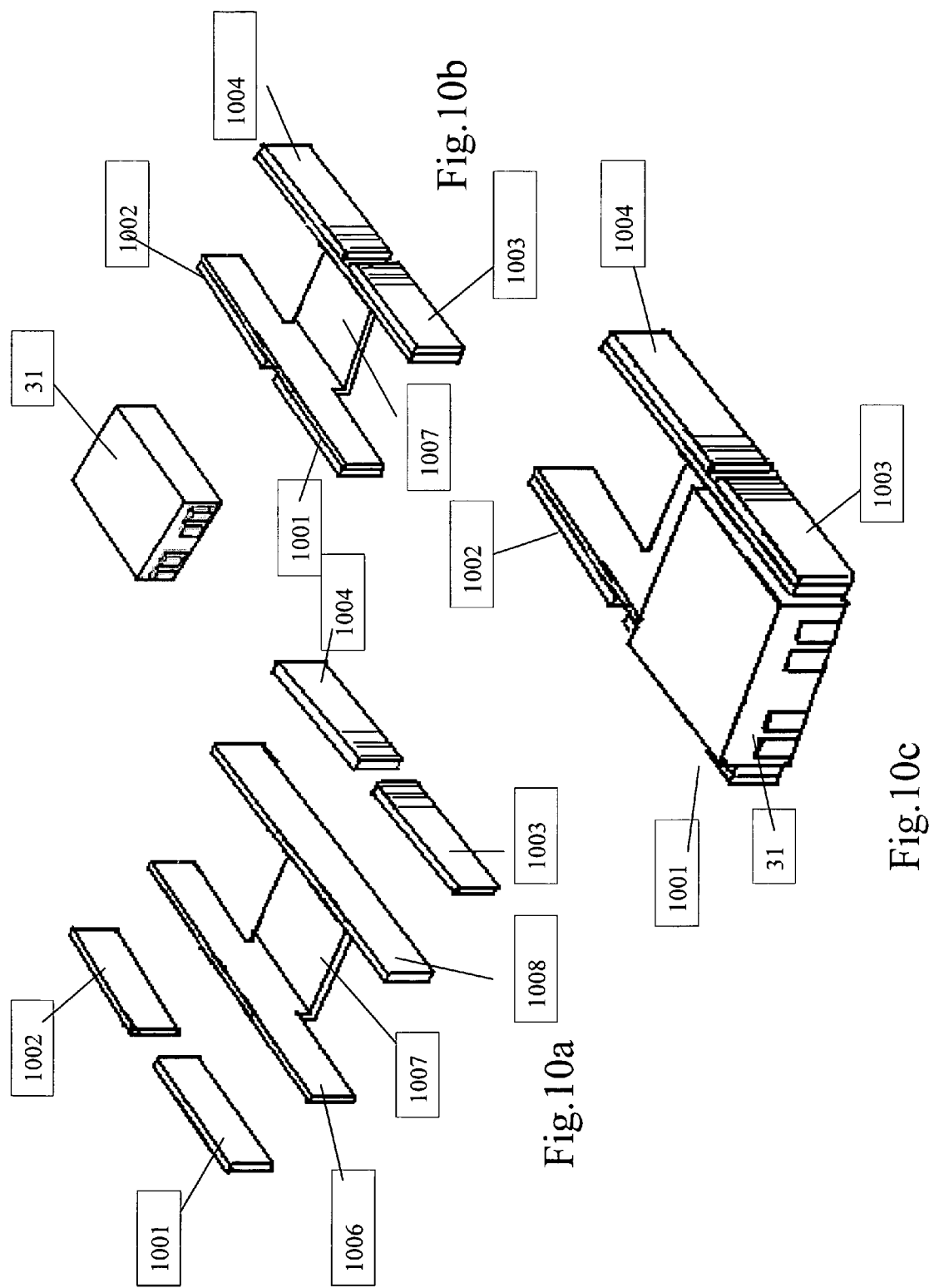

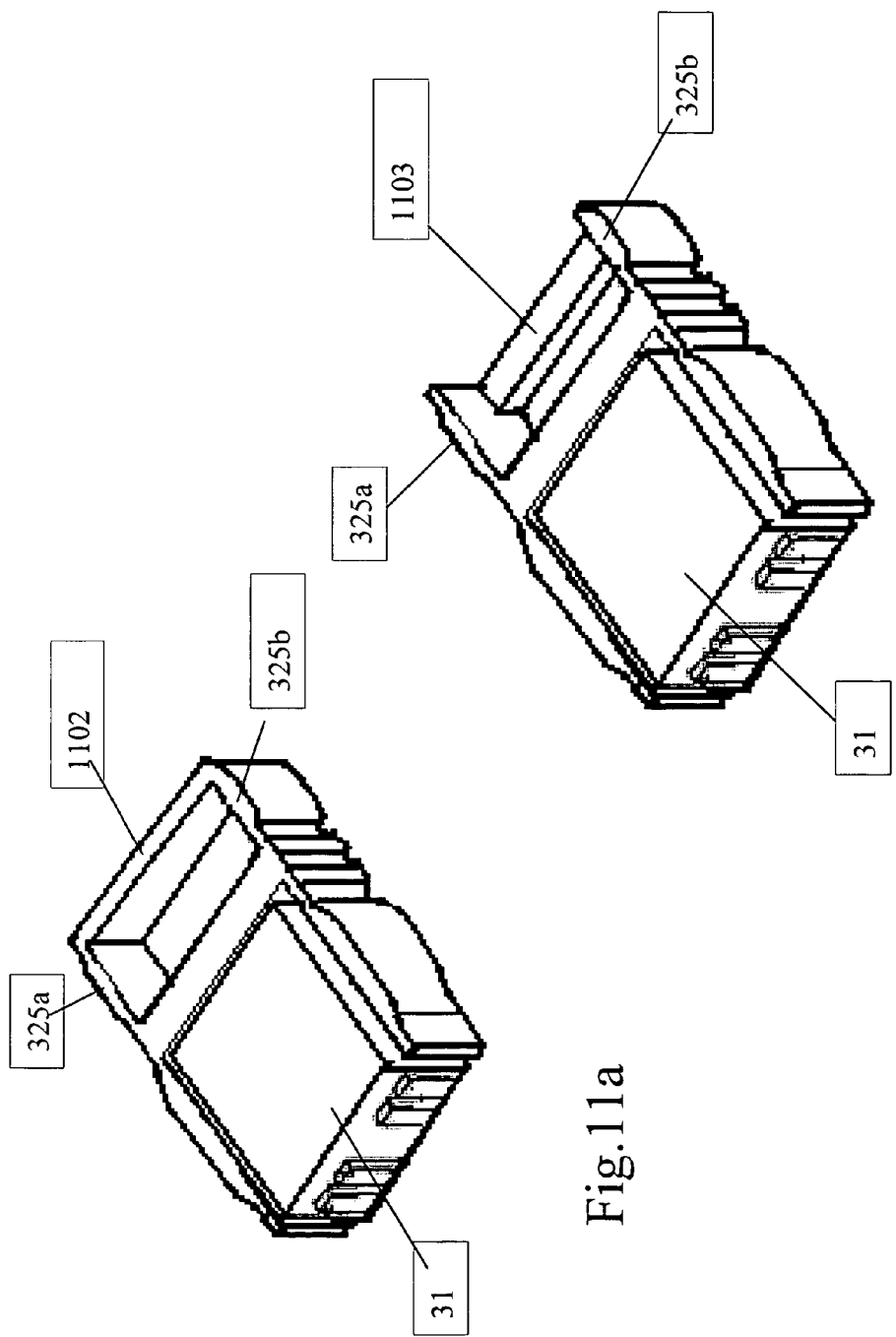

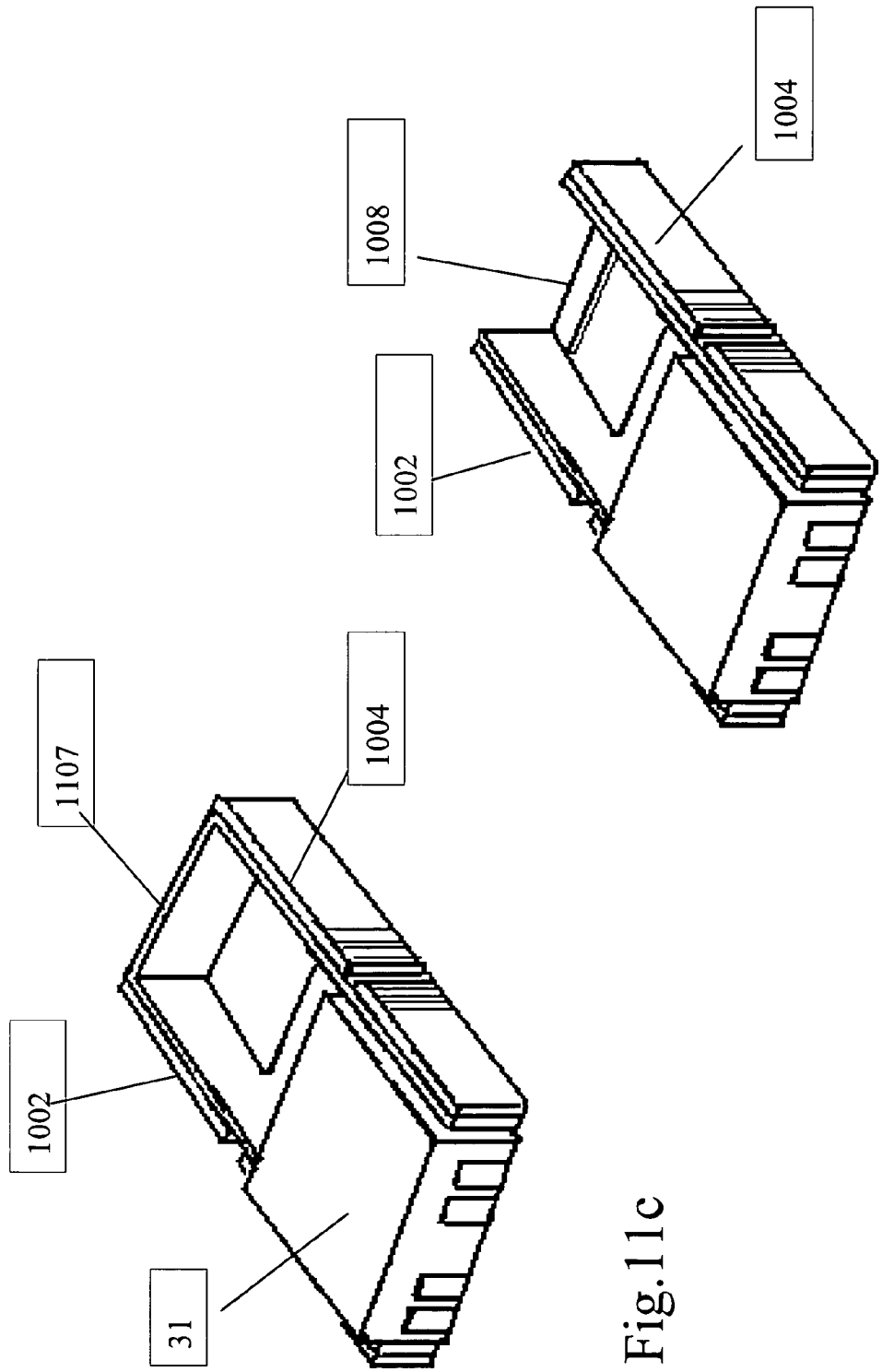

MICRO-ACTUATOR, VIBRATION CANCELLER, HEAD GIMBAL ASSEMBLY, AND DISK DRIVE UNIT WITH THE SAME

FIELD OF THE INVENTION

The present invention relates to disk drive units and, more particularly, to a micro-actuator, a vibration canceller and a head gimbal assembly (HGA) incorporating piezoelectric (PZT) elements. More specifically, the present invention is directed to an improved PZT micro-actuator for an HGA that includes a vibration canceling system that cancels suspension vibration generated by excitation of the micro-actuator when fine tuning the position of a read/write head.

BACKGROUND OF THE INVENTION

One known type of information storage device is a disk drive device that uses magnetic media to store data and a movable read/write head that is positioned over the media to selectively read from or write to the disk.

Consumers are constantly desiring greater storage capacity for such disk drive devices, as well as faster and more accurate reading and writing operations. Thus, disk drive manufacturers have continued to develop higher capacity disk drives by, for example, increasing the density of the information tracks on the disks by using a narrower track width and/or a narrower track pitch. However, each increase in track density requires that the disk drive device have a corresponding increase in the positional control of the read/write head in order to enable quick and accurate reading and writing operations using the higher density disks. As track density increases, it becomes more and more difficult using known technology to quickly and accurately position the read/write head over the desired information tracks on the storage media. Thus, disk drive manufacturers are constantly seeking ways to improve the positional control of the read/write head in order to take advantage of the continual increases in track density.

One approach that has been effectively used by disk drive manufacturers to improve the positional control of read/write heads for higher density disks is to employ a secondary actuator, known as a micro-actuator, that works in conjunction with a primary actuator to enable quick and accurate positional control for the read/write head. Disk drives that incorporate a micro-actuator are known as dual-stage actuator systems.

Various dual-stage actuator systems have been developed in the past for the purpose of increasing the speed and fine tuning the position of the read/write head over the desired tracks on high density storage media. Such dual-stage actuator systems typically include a primary voice-coil motor (VCM) actuator and a secondary micro-actuator, such as a PZT micro-actuator. The VCM actuator is controlled by a servo control system that rotates the actuator arm that supports the read/write head to position the read/write head over the desired information track on the storage media. The PZT micro-actuator is used in conjunction with the VCM actuator for the purpose of increasing the positioning speed and fine tuning the exact position of the read/write head over the desired track. Thus, the VCM actuator makes larger adjustments to the position of the read/write head, while the PZT micro-actuator makes smaller adjustments that fine tune the position of the read/write head relative to the storage media. In conjunction, the VCM actuator and the PZT micro-actuator enable information to be efficiently and accurately written to and read from high density storage media.

One type of micro-actuator, to which the instant invention is primarily directed, incorporates PZT elements for causing fine positional adjustments of the read/write head. Such PZT micro-actuators include associated electronics that are operable to excite the PZT elements on the micro-actuator to selectively cause expansion or contraction thereof. The PZT micro-actuator is configured such that expansion or contraction of the PZT elements cause movement of the micro-actuator which, in turn, causes movement of the read/write head. This movement is used to make faster and finer adjustments to the position of the read/write head, as compared to a disk drive unit that uses only a VCM actuator. Exemplary PZT micro-actuators are disclosed in, for example, JP 2002-133803, entitled "Micro-actuator and HGA" and JP 2002-074871, entitled "Head Gimbal Assembly Equipped with Actuator for Fine Position, Disk Drive Equipped with Head Gimbals Assembly, and Manufacture Method for Head Gimbal Assembly."

FIG. 1a illustrates a head gimbal assembly 277 (HGA) of a conventional disk drive device incorporating a dual-stage actuator. The disk drive device includes, among other things, a magnetic disk and a drive arm 213 for driving the HGA 277 (HGA) with a slider 203 mounted thereon. The disk is mounted on a spindle motor which causes the disk to spin. A voice-coil motor (VCM) is provided for controlling the motion of the drive arm and, in turn, controlling the slider 203 to move from track to track across the surface of the disk, thereby enabling the read/write head to read data from or write data to the disk. In operation, a lift force is generated by the aerodynamic interaction between the slider, incorporating the read/write head, and the spinning magnetic disk. The lift force is opposed by equal and opposite spring forces applied by the suspension 213 such that a predetermined flying height above the surface of the spinning disk is maintained over a full radial stroke of the drive arm 213.

However, because of the inherent tolerances of the VCM and the head suspension assembly, the slider 203 cannot achieve quick and fine position control which adversely impacts the ability of the read/write head to accurately read data from and write data to the disk. As a result, a PZT micro-actuator 205, as described above, is provided in order to improve the positional control of the slider and the read/write head. More particularly, the PZT micro-actuator 205 corrects the displacement of the slider 203 on a much smaller scale, as compared to the VCM, in order to compensate for the resonance tolerance of the VCM and head suspension assembly. The micro-actuator 205 enables, for example, the use of a smaller recording track pitch, and can increase the "tracks-per-inch" (TPI) value by 50% for the disk drive unit, as well as provide an advantageous reduction in the head seeking and settling time. Thus, the PZT micro-actuator 205 enables the disk drive device to have a significant increase in the surface recording density of the information storage disks used therein.

As shown in FIG. 1a, one known type of micro-actuator is a U-shaped micro-actuator 205. This U-shaped micro-actuator 205 has two side arms that hold the slider therebetween and displace the slider by the movement of the side arms. However, movement of the side arms generates a reaction force in the mounting area that will be propagated to a suspension tongue and, in turn, to the suspension itself. The reaction force causes a suspension resonance, or vibration, that will negatively impact the dynamic performance of the HGA. The suspension resonance resulting from operation of the micro-actuator is one factor that limits the bandwidth of the disk drive device.

Referring to FIG. 1b, a conventional PZT micro-actuator 205 includes a ceramic U-shaped frame 297 which has two ceramic beams or side arms 207 each having a PZT element thereon. With reference to FIGS. 1a and 1b, the PZT micro-actuator 205 is physically coupled to a flexure 214. Three electrical connection balls 209 (gold ball bonding or solder ball bonding, GBB or SBB) are provided to couple the micro-actuator 205 to the suspension traces 210 located at the side of each of the ceramic beams 207. In addition, there are four metal balls 208 (GBB or SBB) for coupling the slider 203 to the traces 210.

FIG. 1c generally shows an exemplary process for assembling the slider 203 with the micro-actuator 205. As shown in FIG. 1c, the slider 203 is partially bonded with the two ceramic beams 207 at two predetermined positions 206 by epoxy 212. This bonding makes the movement of the slider 203 dependent on the movement of the ceramic beams 207 of the micro-actuator 205 in an easy and effective manner. A PZT element is attached on each of the ceramic beams 207 of the micro-actuator to enable controlled movement of the slider 203 through excitation of the PZT elements. More particularly, when power is supplied through the suspension traces 210, the PZT elements expand or contract to cause the two ceramic beams 207 of the U-shape frame 297 to deform, thereby making the slider 203 move on the track of the disk in order to fine tune the position of the read/write head. In this manner, controlled displacement of slider 203 can be achieved for fine positional tuning.

While the PZT micro-actuator described above provides an effective and reliable solution for fine tuning the position of the slider, it also results in certain disadvantages. More particularly, because the PZT micro-actuator 205 and the slider 203 are mounted on the suspension tongue, a suspension resonance is generated when the PZT micro-actuator 205 is excited. In other words, the translational motion of the micro-actuator used to displace the slider 203 causes a vibration in the suspension due to the constraint of the U-shaped frame 297 of the micro-actuator. This suspension vibration resonance corresponds to the resonance of the excited suspension base plate, thereby resulting in a significant vibration that limits the servo bandwidth and the capacity improvement of the disk drive device.

FIG. 2 shows a graph of the resonance gain verses frequency for both the excited base plate and excited PZT element on the micro-actuator. As shown in FIG. 2, the numeral 201 represents a resonance curve when the suspension base plate is excited and numeral 202 represents a resonance curve when the micro-actuator 205 is excited. The graph of FIG. 2 shows that under a frequency of 20 kHz, there are significant gain peaks for the suspension frequency response in both the positive and negative directions for both the base plate and the micro-actuator, which demonstrate an adverse resonance characteristic for the device. FIG. 2 also shows the correspondence between the base plate resonance and micro-actuator resonance which combine to magnify the resulting adverse vibration in the device.

Thus, there is a need for an improved micro-actuator for use in head gimbal assemblies and disk drive units that does not suffer from the above-mentioned vibration problems, yet still enables fine tuning of the read/write head.

SUMMARY OF THE INVENTION

A main feature of the present invention is to provide an improved micro-actuator and head gimbal assembly that enables fine head position adjustments and provides improved resonance characteristics.

Another feature of the present invention is to provide a vibration canceling system for micro-actuators that can be easily and effectively incorporated into a head gimbal assembly.

Another feature of the present invention is to provide an improved disk drive unit with a large servo bandwidth and storage capacity, as well as fine head position adjustment using a micro-actuator.

Another feature of the present invention is to provide a vibration canceling system for a micro-actuator that uses PZT elements.

To achieve the above-mentioned features, a micro-actuator for a head gimbal assembly is provided, in accordance with one embodiment of the invention, that includes a base-part plate for connection with a suspension, a pair of actuator side arms connected with the base-part plate and extending in a first direction, wherein at least one of the actuator side arms has a PZT element thereon, and a vibration canceller operable to at least partially cancel a vibration caused by movement of the actuator side arms.

A head gimbal assembly in accordance with another embodiment of the invention includes a slider, a micro-actuator with a vibration cancellation system, and a suspension to load the slider and the micro-actuator. The micro-actuator adjusts the position of the slider, and the vibration cancellation system cancels the suspension vibration resulting from operation of the micro-actuator. In this embodiment of the present invention, the micro-actuator includes a substrate frame with at least one piezoelectric element attached thereto for actuating the slider, and at least one PZT element for canceling the vibration of the suspension caused by operation of the micro-actuator. The substrate frame of the micro-actuator preferably has a base-part plate and two actuate arms. The slider is partially connected with the actuate arms using, for example, epoxy. The substrate frame of the micro-actuator is preferably made of metal (such as the stainless steel), ceramic (such as the zirconia ), silicon or polymer, but any other suitable material(s) may be used. The piezoelectric elements are preferably thin film piezoelectric elements or ceramic piezoelectric elements.

A disk drive unit in accordance with another embodiment of the present invention comprises a head gimbal assembly, a drive arm to connect with the head gimbal assembly, a disk, and a spindle motor to spin the disk. The head gimbal assembly includes a slider, a micro-actuator with a vibration cancellation system, preferably incorporating at least one PZT element, and a suspension to load the slider and the micro-actuator. The micro-actuator adjusts the position of the slider, and the at least one PZT element of the vibration cancellation system is operable to cancel at least some of the suspension vibration resulting from operation of the micro-actuator.

In accordance with the invention, the vibration cancellation system can have a variety of configurations, each of which is capable of at least partially canceling the suspension vibration that results from movement of the slider by operation of the micro-actuator. The slider is connected with the actuate arms of the micro-actuator, and the base-part plate of the micro-actuator is mounted on the suspension. Thus, when the micro-actuator is excited, the actuate arms will bend thereby causing the slider to displace in a controlled manner in order to make a fine head position adjustment. At the same time, the vibration cancellation system operates to cancel the suspension resonance resulting from operation of the micro-actuator. As a result, the resonance characteristic of the suspension is improved, which enables a larger servo bandwidth and improved capacity for disk drive devices.

These and other features and advantages of the instant invention will be further understood by the following description of various exemplary embodiments of the invention and with reference to the appended drawings, in which:

DESCRIPTION OF THE DRAWINGS

FIG. 1a is a perspective view of a conventional HGA;

FIG. 1b is an enlarged, partial view of the HGA of FIG. 1a;

FIG. 1c illustrates a general process of inserting a slider into the micro-actuator of the HGA of FIG. 1a;

FIG. 2 shows resonance curves for the HGA of FIG. 1a;

FIG. 3a is a perspective view of an HGA incorporating a vibration canceller on the micro-actuator, in accordance with a first embodiment of the present invention;

FIG. 3b is an enlarged, partial perspective view of the HGA of FIG. 3a;

FIG. 4a is an exploded view of the HGA of FIG. 3b;

FIGS. 4b and 4c are partial, top views of the micro-actuator with vibration canceller to illustrate the PZT elements shown in FIG. 4a;

FIG. 7a shows the electrical connection relationship of two corresponding PZT elements of the micro-actuator with vibration canceller of FIG. 3a, in accordance with one embodiment of the instant invention;

FIG. 7b shows the electrical connection relationship of two corresponding PZT elements of the micro-actuator with vibration canceller of FIG. 3a, in accordance with another embodiment of the instant invention;

FIG. 7c shows two voltage waveforms which are applied to the two PZT elements of FIG. 7b, respectively;

FIG. 7d shows voltage waveforms which are applied to the two PZT elements of FIG. 7a, respectively;

FIG. 7e shows another view of the micro-actuator with vibration canceller and slider, in accordance with the embodiment of FIG. 3a;

FIGS. 8a and 8b show resonance test results for the embodiment of FIG. 3a;

FIG. 10a is an exploded, perspective view of a micro-actuator with vibration canceller, in accordance with a fourth embodiment of the instant invention;

FIG. 10b illustrates an assembly process for the fourth embodiment shown in FIG. 10a;

FIG. 10c is an assembled, perspective view of the fourth embodiment shown in FIG. 10a;

FIGS. 11a, 11b, 11c and 11d are slider-assembled, perspective views of micro-actuators with vibration cancellers in accordance with a fifth embodiment of the invention.

DETAILED DESCRIPTION OF THE PREFERRED EMBODIMENTS

Figure 2:
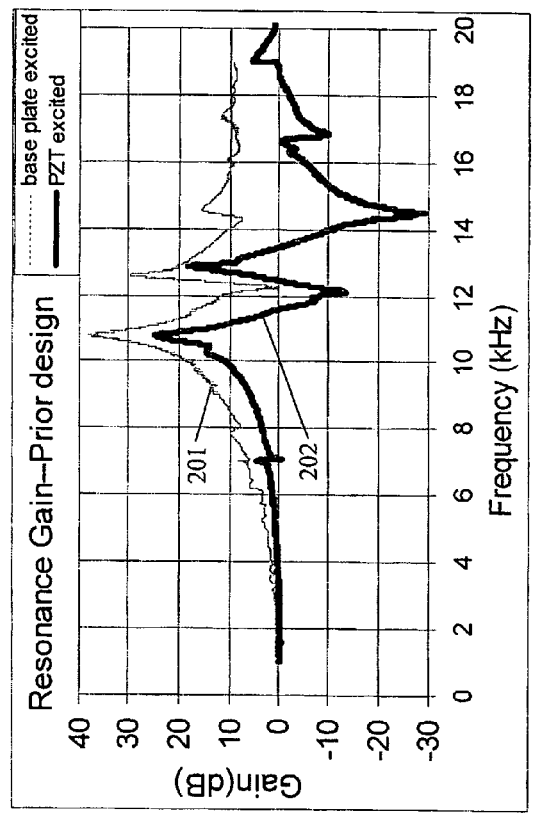

Various preferred embodiments of the instant invention will now be described with reference to the figures, wherein like reference numerals designate similar parts throughout the various views. As indicated above, the instant invention is designed to eliminate, or at least reduce, a vibration that is propagated to an HGA suspension from a micro-actuator when the micro-actuator having PZT elements is excited for the purpose of fine tuning the position of the read/write head. A primary aspect of the instant invention is to provide a vibration canceling system that can be actuated when the micro-actuator is actuated in order to generate a force or forces that is/are operable to counteract reaction forces generated by movement of the micro-actuator and slider upon excitation of the micro-actuator. In a preferred embodiment, the vibration canceling system incorporates PZT elements similar to the PZT elements used on micro-actuator. The PZT elements on the vibration canceling system are configured relative to the PZT elements on the micro-actuator such that they generate opposed forces to those generated by the PZT elements of the micro-actuator. When operated individually, the micro-actuator and the vibration canceller generate a vibration that is propagated to the suspension. However, in accordance with the invention, when the micro-actuator and the vibration canceller are operated together, the respective vibrations are opposed to each other and operate to cancel each other out. By canceling the vibration caused by the micro-actuator, the resonance characteristics of the device are improved, which advantageously enables a larger servo bandwidth and increased storage capacity for the disk drive device.

Several example embodiments of the vibration canceling system of the invention will now be described. Some of the example embodiments are illustrated in the figures and described as being implemented in a conventional HGA of the type described above in connection with FIGS. 1a and 1b. However, it is noted that the invention is not limited to such implementations. Instead, the vibration canceling system of the invention can be implemented in any suitable disk drive device having a micro-actuator in which it is desired to improve the resonance characteristics, regardless of the specific structure of the HGA.

FIG. 3a shows a head gimbal assembly (HGA) 3 incorporating a first exemplary embodiment of the vibration canceling system of the present invention. This first embodiment is shown in FIGS. 3a and 3b as being implemented in a conventional HGA of the type shown in FIGS. 1a and 1b. As explained above, this type of conventional HGA includes a slider 31, a micro-actuator 32 and a suspension 8 to load the slider 31 and the micro-actuator 32. The suspension 8 includes a load beam 17, a flexure 13, a hinge 15 and a base plate 11. The load beam 17 has a dimple 329 (see FIG. 5) formed thereon. On the flexure 13, a plurality of connection pads 308 are provided to connect with a control system (not shown) at one end and a plurality of electrical multi-traces 309, 311 are provided at the other end. The HGA is configured for connection via base plate 11 with a drive arm of a disk drive device. A voice-coil motor (VCM) is provided in the disk drive device for controllably driving the drive arm and, in turn, the HGA in order to enable the HGA to position the slider, and associate read/write head, over any desired information track on a disk in the disk drive device. As explained above, a micro-actuator 32 is provided to enable faster and finer positional control for the device, as well as to reduce the head seeking and settling time during operation. Thus, when the HGA 3 is incorporated into a disk drive device, a dual-stage actuator system is provided in which the VCM actuator provides large positional adjustments and the micro-actuator 32 provides fine positional adjustments for the read/write head. FIG. 3b shows an enlarged partial view of the HGA of FIG. 3a, wherein details of the micro-actuator 32 and vibration canceling system of this embodiment of the invention can be more clearly seen, as will be described in greater detail below.

Referring to FIG. 4a, the flexure 13 also includes a moving plate 323 which connects with the slider 31 and supports the movement thereof, as well as a suspension tongue 328 which is used to support the micro-actuator 32 and the slider 31. The suspension tongue 328 is configured to maintain the loading force on the center area of the slider through the dimple 329 of the load beam 17.

Referring back to the detailed view of the HGA shown in FIG. 3b, a limiter 355 is formed on the load beam 17 which extends through the suspension tongue 328 for preventing the suspension tongue 328 from bending excessively during normal operation of the disk drive device or if the disk drive device is subjected to a shock or vibration. The suspension tongue 328 has a plurality of electrical bonding pads 310 formed thereon. The slider 31 has a plurality of electrical bonding pads 204 on an end thereof corresponding to the electrical bonding pads 113 of the moving plate 323.

Referring now more particularly to the exploded view of the HGA shown in FIG. 4a, according to the first embodiment of the invention, the micro-actuator 32 comprises an H-shaped frame 320 and four PZT elements 321a/321b/321c/321d mounted thereon. The H-shaped frame 320 can be made of metal (e.g., stainless steel), ceramic (e.g., zirconia), silicon, polymer or any other suitable material. The H-shaped frame 320 includes a pair of actuate arms 322a/322b, a base-part plate 352 and a pair of canceling arms 325a/325b. Actuate arm 322a and canceling arm 325a are coupled with the actuate arm 322b and canceling arm 325b by base-part plate 352. In addition, there are three electric bonding pads 333 for the PZT elements on each side (321a-321c or 321b-321d) of the micro-actuator 32, which correspond to the electric bonding pads 310 in the suspension tongue 328.

As seen more clearly in FIG. 4b, both PZT elements 321a and 321c or 321b and 321d may share a common ground pad, and the other pads are for respective inputs to the PZT elements. Three electric balls 334 are used to couple the PZT element to the suspension at each side thereof. The slider 31 is held between the two actuate arms 322a/322b of the H-shaped frame 320 of the micro-actuator 32.

Figure 1C:
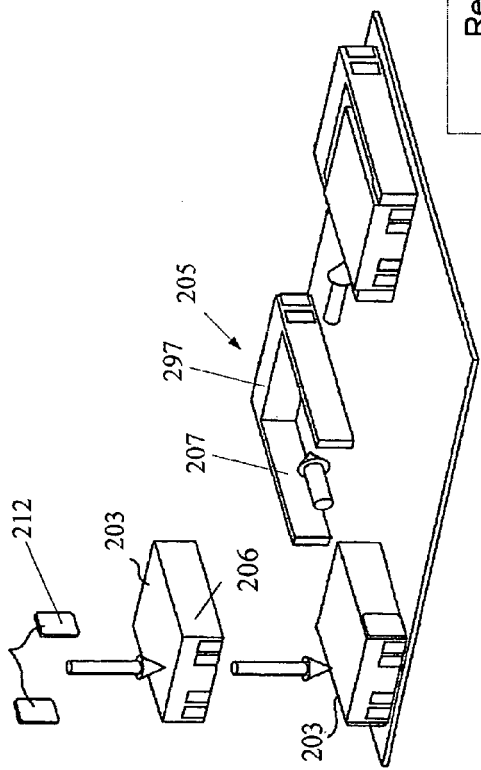

While the slider 31 and micro-actuator 32 can be assembled using any suitable process, they are preferably assembled in a similar manner as that shown in FIG. 1c. More particularly, referring again to FIG. 4a, the slider 31 is inserted into the H-shaped frame 320 of the micro-actuator 32. The two actuate arms 322a and 322b are coupled to the slider 31 using, for example, epoxy. Then, the base-part plate 352 is mounted on the suspension tongue 328, such that a parallel gap exist between the suspension tongue 328 and the micro-actuator 32. In an alternative embodiment of the assembly process, the micro-actuator 32 may be mounted on the suspension prior to having the slider 31 inserted in and connected therewith. One advantage of the invention, that can be seen most clearly in FIGS. 3b and 4a, is that very little modifications need to be made to a conventional HGA to incorporate the vibration canceller of the present invention therein.

FIG. 4b shows further details of the PZT elements in accordance with a preferred embodiment of the invention. As shown in FIG. 4b, each PZT element 321a/321b or 321c/321d is directly attached to or laminated on the actuate arms 322a/322b or 325c/325b. In an alternative embodiment shown in FIG. 4c, PZT units are provided which include both of the PZT elements (321a/321c or 321b/321d) for each side of the H-shaped frame 320. The PZT units are then attached on the respective actuate arms 322a/322b and 325a/325b, gas opposed to attaching each individual PZT element as shown in the embodiment of FIG. 4b. Each PZT unit includes a substrate 360 with each pair of PZT elements 321a/321c or 321b/321d formed thereon for each side of the H-shaped frame 320, respectively. As will be described in further detail below, the PZT elements 321a, 321b are used for fine head displacements, and the other two PZT elements 321c, 321d are used for canceling the suspension vibration generated when the micro-actuator is operated. Each of these functions is accomplished by selectively exciting the PZT elements, using an electrical power source, to cause selective expansion and contraction of the PZT elements, which results in selective movement of each of the actuate arms 322a, 322b, 325a and 325b. Preferably, each pair of PZT elements 321a/321c or 321b/321d have a common ground pad at a middle portion thereof and two separate pads for respective input to each individual PZT element. The substrate 360 is preferably made of ceramic, metal (e.g., stainless steel) or polymer material, but any other suitable material may be used. The PZT elements are preferably a block of ceramic or thin film PZT. The PZT elements may be either single layer or multi-layer PZT.

Figure 5:
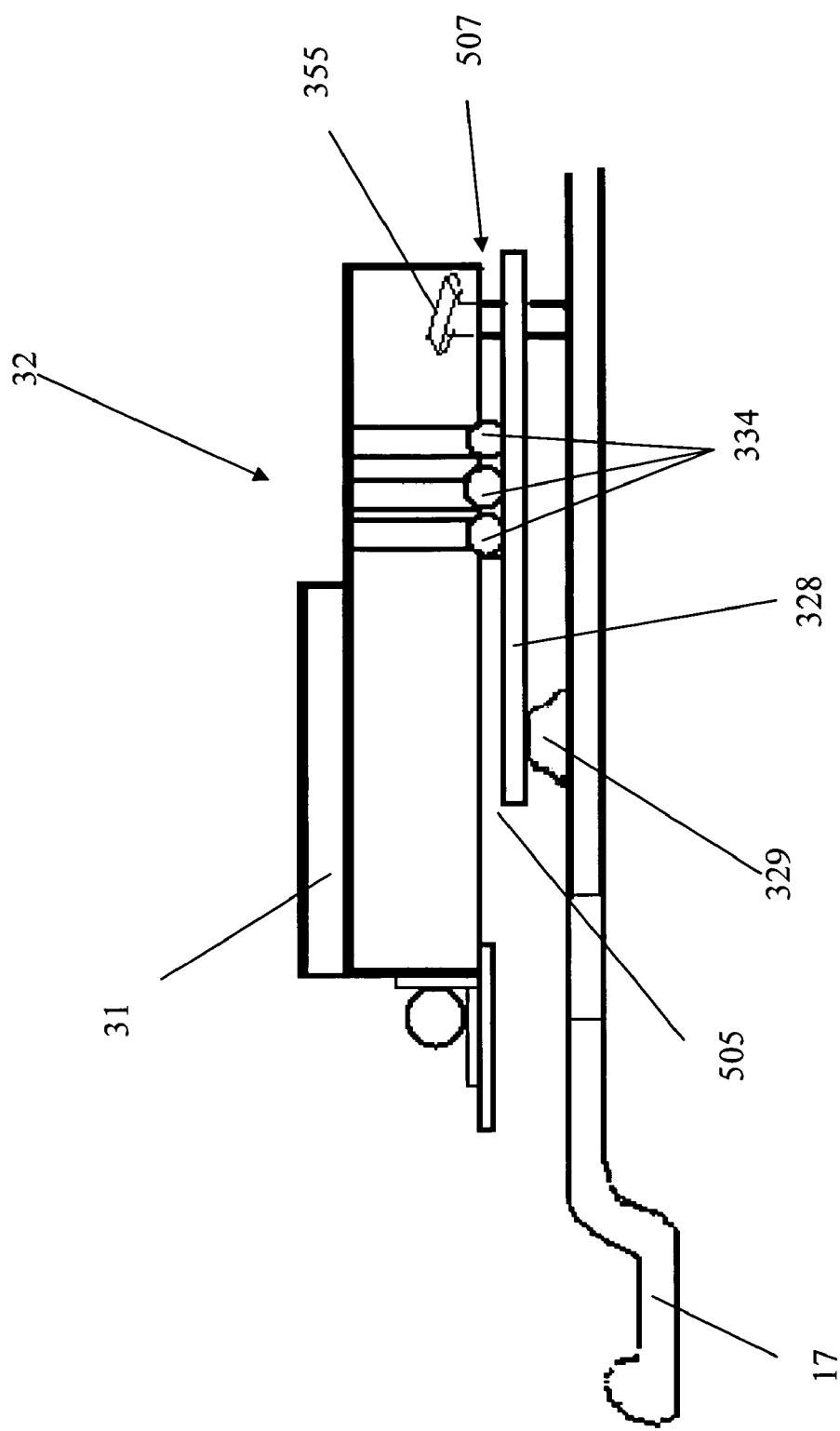
FIG. 5 is a side view of the micro-actuator area of the HGA of FIG. 3b.

FIG. 5 shows a side view of the HGA in accordance with a preferred embodiment of the invention. As shown in FIG. 5, the base-part plate 352 of the micro-actuator 32 is mounted on the suspension tongue 328 and a dimple 329 on the load beam 17 supports the suspension tongue 328 and the micro-actuator 32. Parallel gaps 505 and 507 exist between the micro-actuator 32 and the suspension tongue 328 in order to enable the slider 31 and the micro-actuator 32 to move freely, as well as to enable the vibration canceller to freely operate.

Figure 6B:
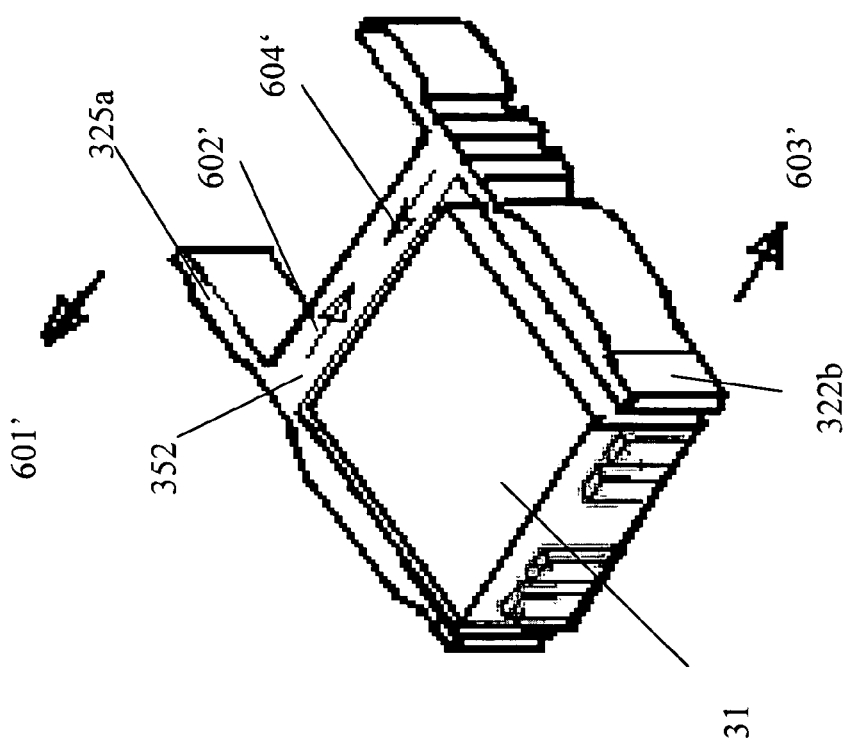
FIG. 6b is a perspective view of the micro-actuator with slider and vibration canceller of FIG. 3a, illustrating a second operating state.
Figure 6A:
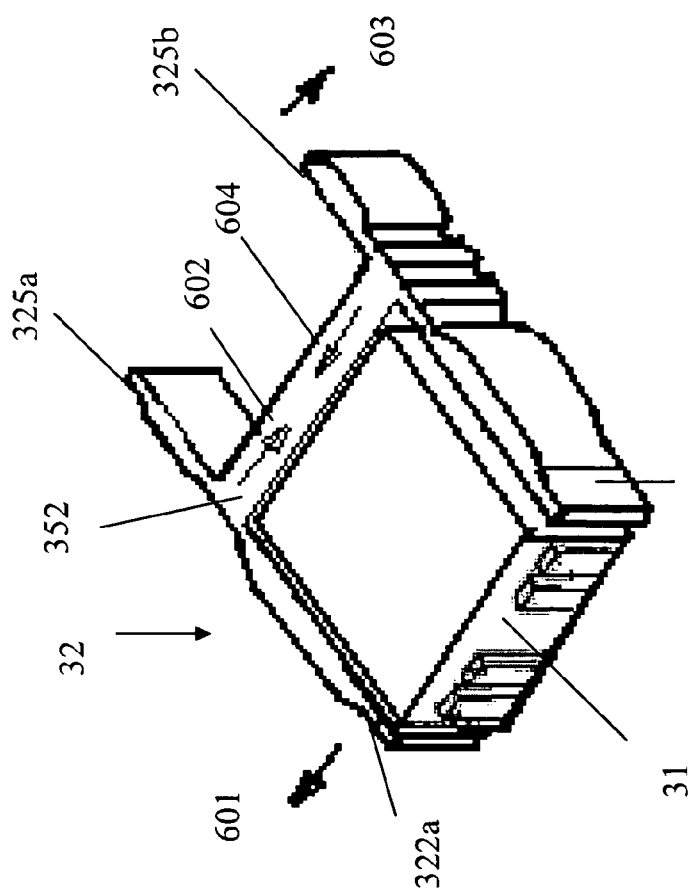
FIG. 6a is a perspective view of the micro-actuator with slider and vibration canceller of FIG. 3a, illustrating a first operating state.

FIGS. 6a and 6b illustrate how the vibration canceller of the first embodiment of the instant invention works. Referring to FIG. 6a, when a voltage is input to the micro-actuator 32, the first actuate arm 322a will bend toward the outside, as represented by arrow 601, due to contraction or shrinking of the PZT element on the first actuate arm 322a. This outside bending motion of arm 322a facilitates the slider movement for fine tuning the position thereof. However, the contraction of arm 322a also causes a stress 602 in the base-part plate 352 that may be propagated to the suspension tongue through the base-part plate 352, thereby generating a suspension vibration. In accordance with the instant invention, a voltage is also input to the vibration canceller to cause the actuate arm 325b to bend toward the outside, in the direction shown by arrow 603. This additional outward bending will also generate a stress 604 in the base-part plate 352, thereby also generating a vibration of the suspension. However, since this additional vibration has an opposed phase compared with the suspension vibration caused by operation of the micro-actuator, the vibrations will cancel each other and result in a very clear resonance curve.

FIG. 6b illustrates a similar operation when the slider 31 is moved by the micro-actuator in the opposite direction, represented by arrow 603', from that shown in FIG. 6a. As shown in FIG. 6b, movement in the direction 603' causes stress 604' in the base-part plate 352 which, in accordance with the invention, is counteracted by stress 602' caused by outward movement of the vibration canceller arm 325a, as indicated by arrow 601'. Thus, by generating a counteracting stress or force (e.g., 604, 602') in the base-part plate using the vibration canceller of the invention a very clear resonance curve can be achieved even when the micro-actuator makes fine adjustments to the position of the slider. In addition, the canceling arms 325a and 325b may be coupled at their ends with a support plate, like the support plates 1102 or 1103 shown in the embodiments of FIGS. 11a and 11b, in order to more effectively cancel the vibration. More specifically, the support plate will cause the canceling arms 325a, 325b to generate opposite motion inertia to that of the micro-actuator when the actuate arms 322a or 322b are operated, thereby further reducing vibration.

FIGS. 7a-7d show typical operation methods used in connection with the instant invention. The graphs of FIGS. 7c and 7d show volts against frequency for each of the operation methods. FIG. 7e shows another view of the micro-actuator 32 with vibration canceller and slider 31 to explain the operation methods, in accordance with the first embodiment of the instant invention. FIG. 7b shows a first operation method when the vibration canceller arm 325b has an opposed polarization with respect to the actuate arm 322a. The operation input for this first operation method is shown in FIG. 7c, wherein the micro-actuator input 701a is a sine voltage 708 and vibration canceller input 701b is an opposed sine voltage 706. FIG. 7a shows a second operation method when the vibration canceller arm 325a has the same polarization relative to the actuate arm 322b. The operation input for this second operation method is shown in FIG. 7d, wherein the input 701b for the vibration canceller has the same sine voltage 709 as the input 701a for the micro-actuator. Numeral 703 represents a common ground in both FIGS. 7a and 7b.

FIGS. 8a and 8b show resonance test results for a micro-actuator with vibration canceller made in accordance with the instant invention. In FIG. 8a, line 802 shows the micro-actuator operation resonance (which has an in phase line 806 in FIG. 8b), and line 803 shows the resonance for the vibration canceller operation (which has an opposed phase line 804 in FIG. 8b). In accordance with the instant invention, the vibration canceller enables the suspension vibration to be cancelled due to the two opposed phase vibrations. Line 805 in FIG. 8a show the resulting resonance gain and line 808 in FIG. 8b show the resulting resonance phase. As can be seen by these test results, the invention significantly improves the operation of the device in a manner that facilitates fine head adjustments, larger servo bandwidths and increased disk storage capacity.

Figure 9B:
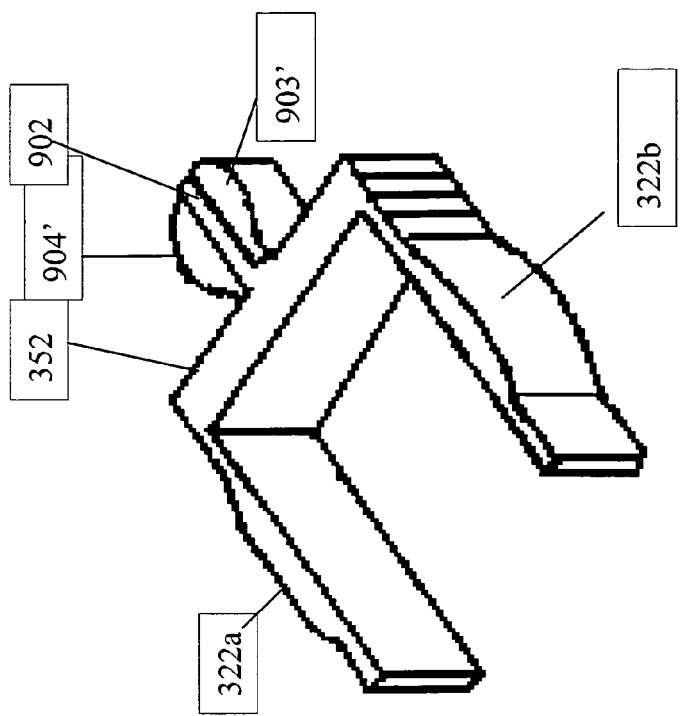
FIG. 9b is a perspective view of a micro-actuator with vibration canceller, in accordance with a third embodiment of the instant invention.
Figure 9A:
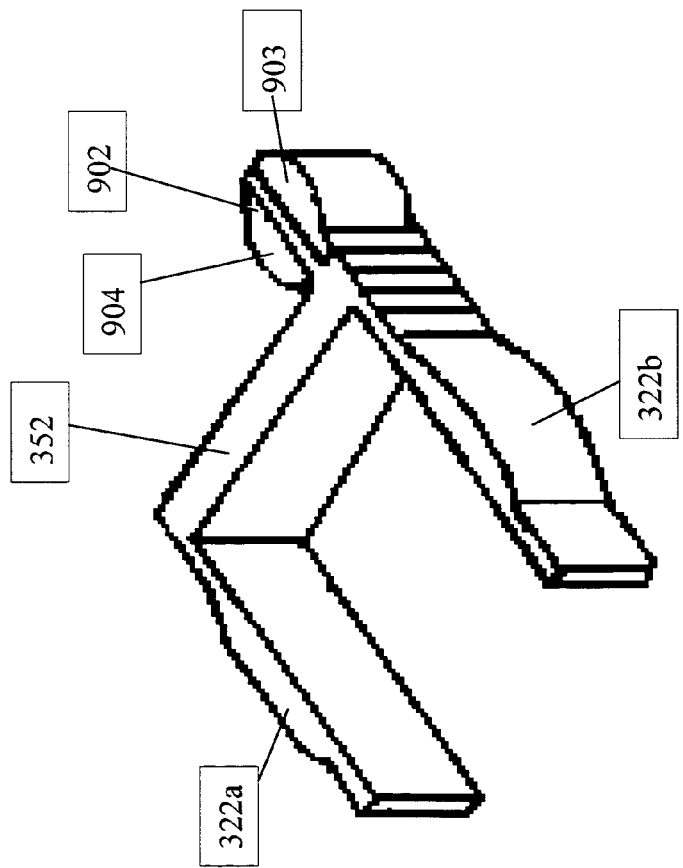
FIG. 9a is a perspective view of a micro-actuator with vibration canceller, in accordance with a second embodiment of the instant invention.

FIG. 9a shows a second embodiment of the instant invention, in which a single canceller arm 902 is provided on the micro-actuator. In other words, in this second embodiment, the vibration canceller has a common substrate 902 with two PZT elements 903 and 904 on opposite sides thereof. FIG. 9b shows a third embodiment of the invention, which is similar to the second embodiment, except that the common substrate 902 is positioned at a central portion, rather than at an end portion of the base-part plate 352 of the micro-actuator. In other embodiments, the location of the single or multiple substrates with PZT elements that define the vibration canceller of the invention can be changed. The shape and/or configuration of the micro-actuator, substrate(s) and/or PZT elements can also be changed as a matter of design choice or to suit the needs of the particular application in which the invention is employed. The exemplary operating methods described in connection with FIGS. 7a-7d can be similarly employed with the alternative embodiments described herein or otherwise developed based on the teachings of this invention.

FIGS. 10a-10c show a fourth embodiment of the invention in which the base-part plate 1007 has a different configuration as compared to the base-part plate 352 in the other embodiments described herein. FIG. 10a shows an H-shaped metal frame with four PZT elements 1001, 1002, 1003 and 1004, for the micro-actuator and vibration canceller. The two side arms 1006 and 1008 are formed from the side of the base-part plate 1007. FIG. 10b shows an exemplary assembly process for mounting the slider 31 to the micro-actuator. FIG. 10c shows the fully assembled micro-actuator with vibration canceller and slider, in accordance with the fourth embodiment of the instant invention. Again, operation methods as described above with respect to FIGS. 7a-7d may also be used with this fourth embodiment.

FIGS. 11a and 11b show a fifth embodiment of the invention in which the canceling arms 325a and 325b of the micro-actuator are coupled at their top end with a support plate 1102 or 1103. The support plate 1102 of FIG. 11a is connected with the canceling arms 325a and 325b in a vertical orientation. In contrast, the support plate 1103 in FIG. 11b is connected with the canceling arms 325a and 325b in a horizontal orientation. In addition, the two actuate arms 322a and 322b may be coupled together with another support plate (not shown) that is similar to the support plate 1102 or 1103. The use of the support plates to couple the arms of the micro-actuator helps to further reduce vibration in the device.

FIGS. 11c and 11d show a sixth embodiment of the invention in which the vibration canceling arms 1002 and 1004 are coupled at the ends thereof with a support plate 1107 or 1108. Other than the support plates 1107 and 1108, the sixth embodiment is similar to the embodiment of FIGS. 10a-10c. Like the fifth embodiment, the support plate 1107 of FIG. 11c is connected with the vibration canceller arms 1002 and 1004 in a vertical orientation, and the support plate 1108 in FIG. 11d is connected with vibration canceller arms 1002 and 1004 in a horizontal orientation. Again, the support plates 1107, 1108 help to further reduce vibrations. An additional support plate (not shown) may be used in this or any other of the other embodiments herein to also couple the actuate arms (e.g., 322a, 322b) together, if desired.

While various embodiments of the micro-actuator with vibration canceller have been described herein, other configurations of the micro-actuator and/or vibration canceller are also possible, as one skilled in the art will readily understand from the description of the invention herein. For example, the vibration canceller could be provided as a separate structure from the micro-actuator itself. In this case, the vibration canceller could have its own base-part plate that is mounted independently on the suspension tongue (or elsewhere) to provide the desired vibration cancellation result.

Figure 12:
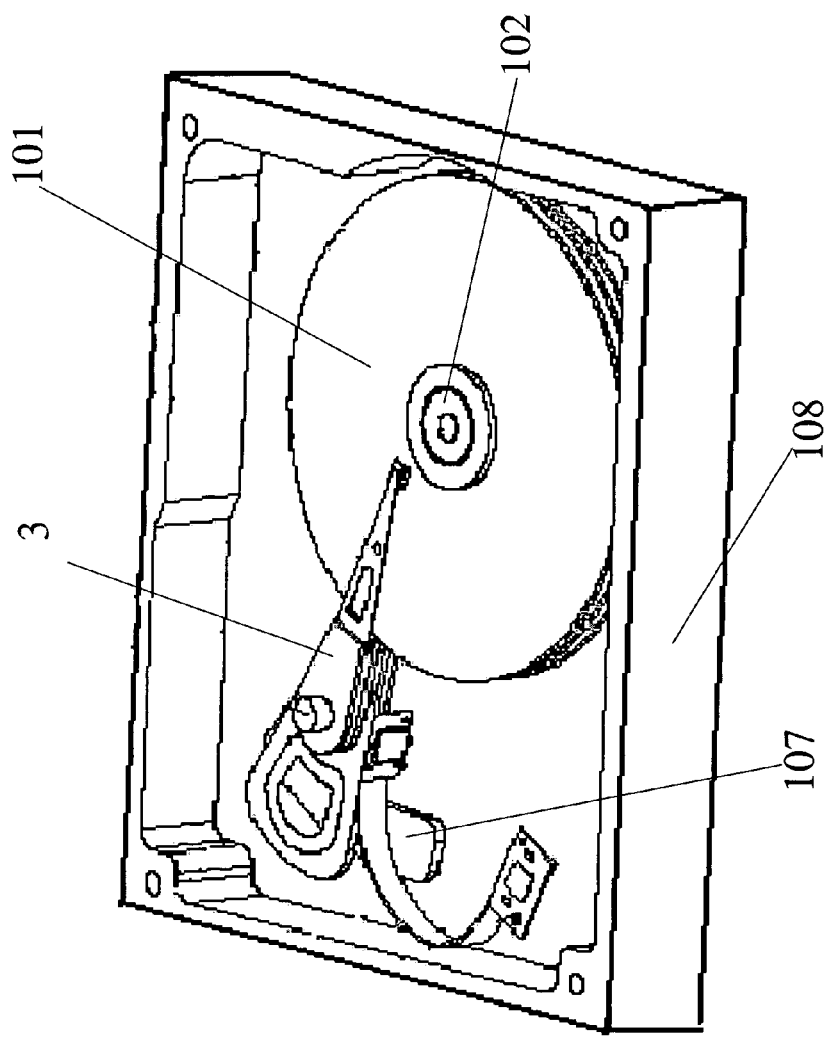
FIG. 12 is a perspective view of an exemplary disk drive unit incorporating an embodiment of the micro-actuator and vibration canceller of the instant invention.

FIG. 12 shows an exemplary disk drive unit (HDD) incorporating the vibration clearer technology of the instant invention. The HDD includes a housing 108, a disk 101, a spindle motor 102, a VCM 107 with an HGA 3 constructed in accordance with the instant invention to enable advantageous resonance performance when the micro-actuator is operated to make fine head position adjustments. More specifically, the HGA 3 in FIG. 12 is provided with an embodiment of the micro-actuator and vibration canceller as described herein. Because the structure, operation and assembly processes of disk drive units are well known to persons of ordinary skill in the art, further details regarding the disk drive unit are not provided herein so as not to obscure the invention.

While the preferred forms and embodiments of the invention have been illustrated and described herein, various changes and/or modifications can be made within the scope of the instant invention. Thus, the embodiments described herein are meant to be exemplary only and are not intended to limit the invention to any of the specific features thereof, except to the extent that any of specific features are expressly recited in the appended claims.

What is claimed is:

1. A micro-actuator for a head gimbal assembly, comprising:
   a base-part plate for connection with a suspension;
   a pair of actuator side arms connected with the base-part plate and extending in a first direction, wherein at least one of the actuator side arms has a PZT element thereon; and
   a vibration canceller operable to at least partially cancel a vibration caused by movement of the actuator side arms;
   wherein the vibration canceller includes at least one canceling arm extending from the base-part plate in a second direction that is opposite to the first direction, wherein the at least one canceling arm includes at least one PZT element thereon.

2. The micro-actuator of claim 1, wherein the vibration canceller includes a pair of the canceling arms extending in the second direction, each of the canceling arms having a PZT element thereon.

3. The micro-actuator of claim 2, wherein the actuator side arms and the canceling arms have the PZT elements on an outwardly facing side thereof.

4. The micro-actuator of claim 2, wherein the canceling arms are connected with each other by a support plate.

5. The micro-actuator of claim 1, wherein the first direction and the second direction are perpendicular to the base-part plate.

6. The micro-actuator of claim 1, wherein the vibration canceller includes a single canceling arm having a PZT element on both side portions thereof.

7. The micro-actuator of claim 6, wherein the single canceling arm extends from a middle portion or a side portion of the base-part plate.

8. The micro-actuator of claim 1, wherein the at least one canceling arm is made of ceramic, stainless steel, silicon or polymer.

9. The micro-actuator of claim 1, wherein the PZT elements are ceramic or thin film PZT elements.

10. The micro-actuator of claim 1, wherein the PZT elements are single layer or multilayer PZT elements.

11. A head gimbal assembly, comprising:
    a micro-actuator;
    a slider connected with the micro-actuator; and
    a suspension for supporting the micro-actuator;
    wherein the micro-actuator includes:
       a base-part plate for connection with the suspension;
       a pair of actuator side arms connected with the base-part plate and extending in a first direction, wherein at least one of the actuator side arms has a PZT element thereon; and
       a vibration canceller for at least partially canceling a vibration caused by movement of the actuator side arms;
    wherein the vibration canceller includes at least one canceling arm extending from the base-part plate in a second direction that is opposite to the first direction, wherein the at least one canceling arm includes at least one PZT element thereon.

12. The head gimbal assembly of claim 11, wherein the vibration canceller includes a pair of the canceling arms extending in the second direction, each of the canceling arms having a PZT element thereon.

13. The head gimbal assembly of claim 12, wherein the actuator side arms and the canceling arms have the PZT elements on an outwardly facing side thereof.

14. The head gimbal assembly of claim 11, wherein the first direction and the second direction are perpendicular to said base-part plate.

15. The head gimbal assembly of claim 11, wherein the vibration canceller includes a single canceling arm having a PZT element on both side portions thereof.

16. The head gimbal assembly of claim 15, wherein the single canceling arm extends from a middle portion or a side portion of the base-part plate.

17. The head gimbal assembly of claim 11, wherein the base-part plate of micro-actuator is mounted on the suspension and a parallel gap exists between all arms of the micro-actuator and the suspension.

18. The head gimbal assembly of claim 11, wherein the at least one canceling arm is made of ceramic, stainless steel, silicon or polymer.

19. The head gimbal assembly of claim 11, wherein the PZT elements are ceramic or thin film PZT elements.

20. The head gimbal assembly of claim 11, wherein the PZT elements are single layer or multilayer PZT elements.

21. A disk drive unit, comprising:
    a head gimbal assembly, including a slider, a micro-actuator and a suspension supporting the micro-actuator;
    a drive arm connected to the head gimbal assembly;
    a disk; and
    a spindle motor operable to spin the disk;
    wherein the micro-actuator includes:
       a base-part plate for connection with the suspension;
       a pair of actuator side arms connected with the base-part plate and extending in a first direction, wherein at least one of the actuator side arms has a PZT element thereon; and
       a vibration canceller for at least partially canceling a vibration caused by movement of the actuator side arms:
    wherein the vibration canceller includes at least one canceling arm extending from the base-part plate in a second direction that is opposite to the first direction, wherein the at least one canceling arm includes at least one PZT element thereon.

22. The disk drive unit of claim 21, wherein the base-part plate of the micro-actuator is mounted on the suspension and a parallel gap exists between all arms of the micro-actuator and the suspension.

* * * * *